United States Patent
Jeng et al.

(10) Patent No.: US 10,371,823 B2
(45) Date of Patent: Aug. 6, 2019

(54) SYSTEM AND METHOD FOR RANGING A PRN RECEIVER WITH A PRN COMPOSITE CODE

(71) Applicant: The Boeing Company, Chicago, IL (US)

(72) Inventors: Isaac Jeng, Yorba Linda, CA (US); Kamran Ghassemi, Orange, CA (US)

(73) Assignee: The Boeing Company, Chicago, IL (US)

(*) Notice: Subject to any disclaimer, the term of this patent is extended or adjusted under 35 U.S.C. 154(b) by 321 days.

(21) Appl. No.: 15/265,967

(22) Filed: Sep. 15, 2016

(65) Prior Publication Data

US 2018/0074157 A1    Mar. 15, 2018

(51) Int. Cl.
| | | |
|---|---|---|
| *G01S 19/30* | (2010.01) | |
| *G01S 5/02* | (2010.01) | |
| G01S 19/42 | (2010.01) | |
| G01S 19/14 | (2010.01) | |
| G01S 19/02 | (2010.01) | |
| G01S 11/02 | (2010.01) | |

(52) U.S. Cl.
CPC ............ *G01S 19/30* (2013.01); *G01S 5/0226* (2013.01); *G01S 5/0221* (2013.01); *G01S 11/02* (2013.01); *G01S 19/02* (2013.01); *G01S 19/14* (2013.01); *G01S 19/42* (2013.01)

(58) Field of Classification Search
CPC .......... G01S 19/42; G01S 19/14; G01S 19/30; G01S 5/0221; G01S 5/0226
USPC ........................................ 342/357.69, 357.52
See application file for complete search history.

(56) References Cited

U.S. PATENT DOCUMENTS

| | | | | |
|---|---|---|---|---|
| 4,278,977 A * | 7/1981 | Nossen | ................... | G01S 13/79 342/125 |
| 6,236,673 B1 * | 5/2001 | Julg | ....................... | G01S 19/22 342/357.61 |
| 6,650,282 B2 * | 11/2003 | Martikka | ................ | G01S 19/40 342/357.23 |
| 6,985,743 B2 * | 1/2006 | Bajikar | ................. | G01S 5/0289 342/357.48 |
| 7,205,935 B2 * | 4/2007 | Sleewaegen | ............ | G01S 19/22 342/357.61 |
| 8,330,648 B2 * | 12/2012 | Park | ....................... | G01S 13/76 342/107 |
| 8,467,347 B2 * | 6/2013 | Gao | ..................... | H04B 1/7073 370/330 |

(Continued)

*Primary Examiner* — Chuong P Nguyen
(74) *Attorney, Agent, or Firm* — Perman & Green, LLP

(57) ABSTRACT

In accordance with one or more aspects of the present disclosure, a method for ranging of a PRN receiver including generating, at a PRN transmitting device that includes a processor and wireless transmitter and is in a line-of-sight position with the PRN receiver, at least two component codes, time shifting, with the processor of the PRN transmitting device, the at least two component codes relative to each other to form time shifted component codes, wirelessly transmitting, with the PRN transmitting device, the time shifted component codes to the PRN receiver with a predetermined modulation, and receiving the time shifted component codes with the PRN receiver that includes a PRN receiver processor, and determining a range estimate of the PRN receiver based on a combination of the time shifted component codes with the PRN receiver processor.

20 Claims, 18 Drawing Sheets

(56) References Cited

U.S. PATENT DOCUMENTS

| | | | | |
|---|---|---|---|---|
| 8,675,561 B2* | 3/2014 | Sun | ............... | G01S 5/0205 |
| | | | | 370/328 |
| 8,879,407 B2* | 11/2014 | Ekbal | ............... | G01S 13/765 |
| | | | | 342/458 |
| 8,886,125 B2* | 11/2014 | Agrawal | ............... | H04W 76/14 |
| | | | | 455/41.3 |
| 9,215,581 B2* | 12/2015 | Julian | ............... | H04W 64/006 |
| 2004/0198387 A1* | 10/2004 | Tsuji | ............... | G01S 5/0036 |
| | | | | 455/456.1 |
| 2007/0285306 A1* | 12/2007 | Julian | ............... | G01S 13/765 |
| | | | | 342/118 |
| 2017/0115373 A1* | 4/2017 | Lindstrom | ............... | G03B 17/38 |
| 2017/0168154 A1* | 6/2017 | Wallin | ............... | G01S 13/76 |

* cited by examiner

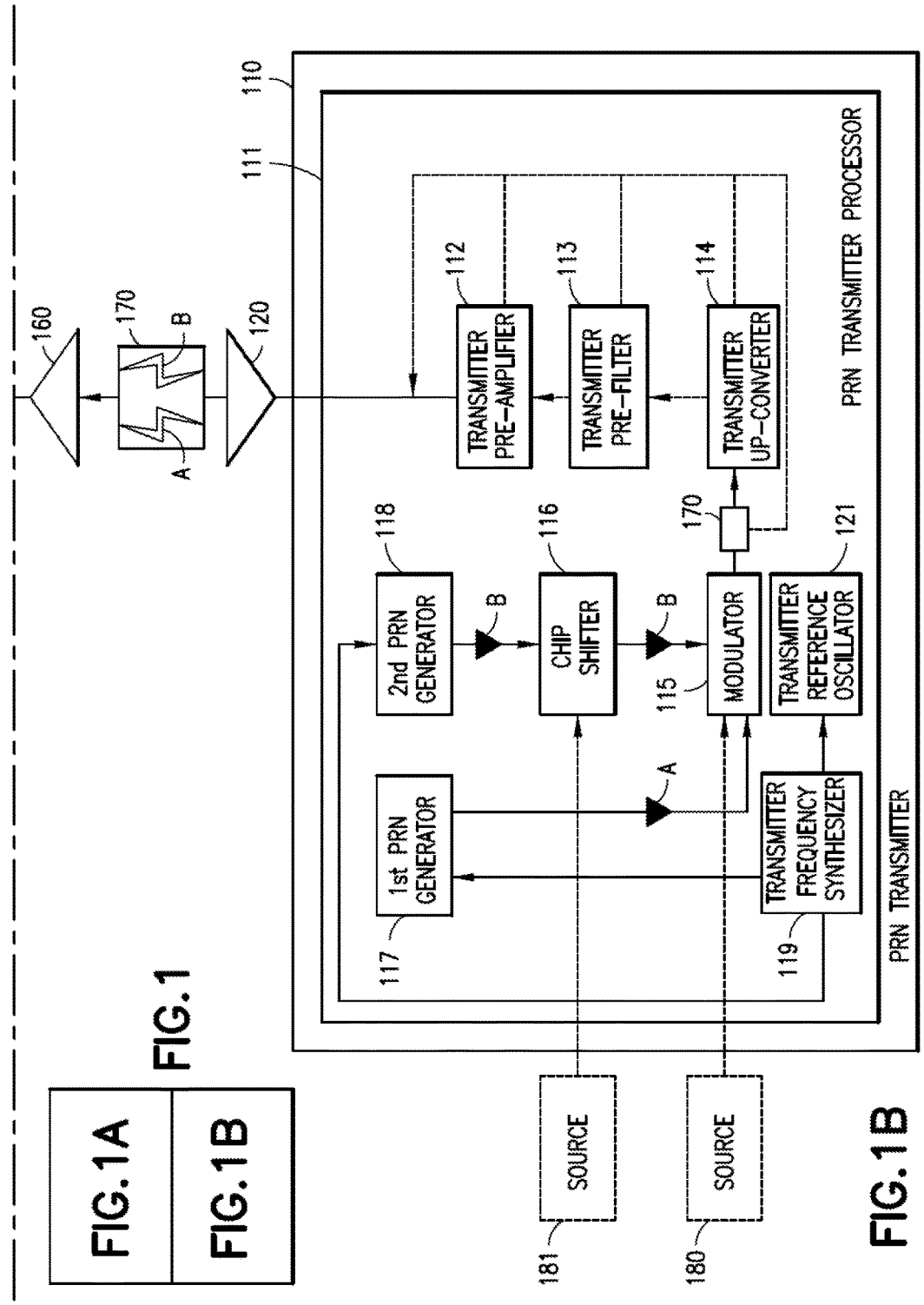

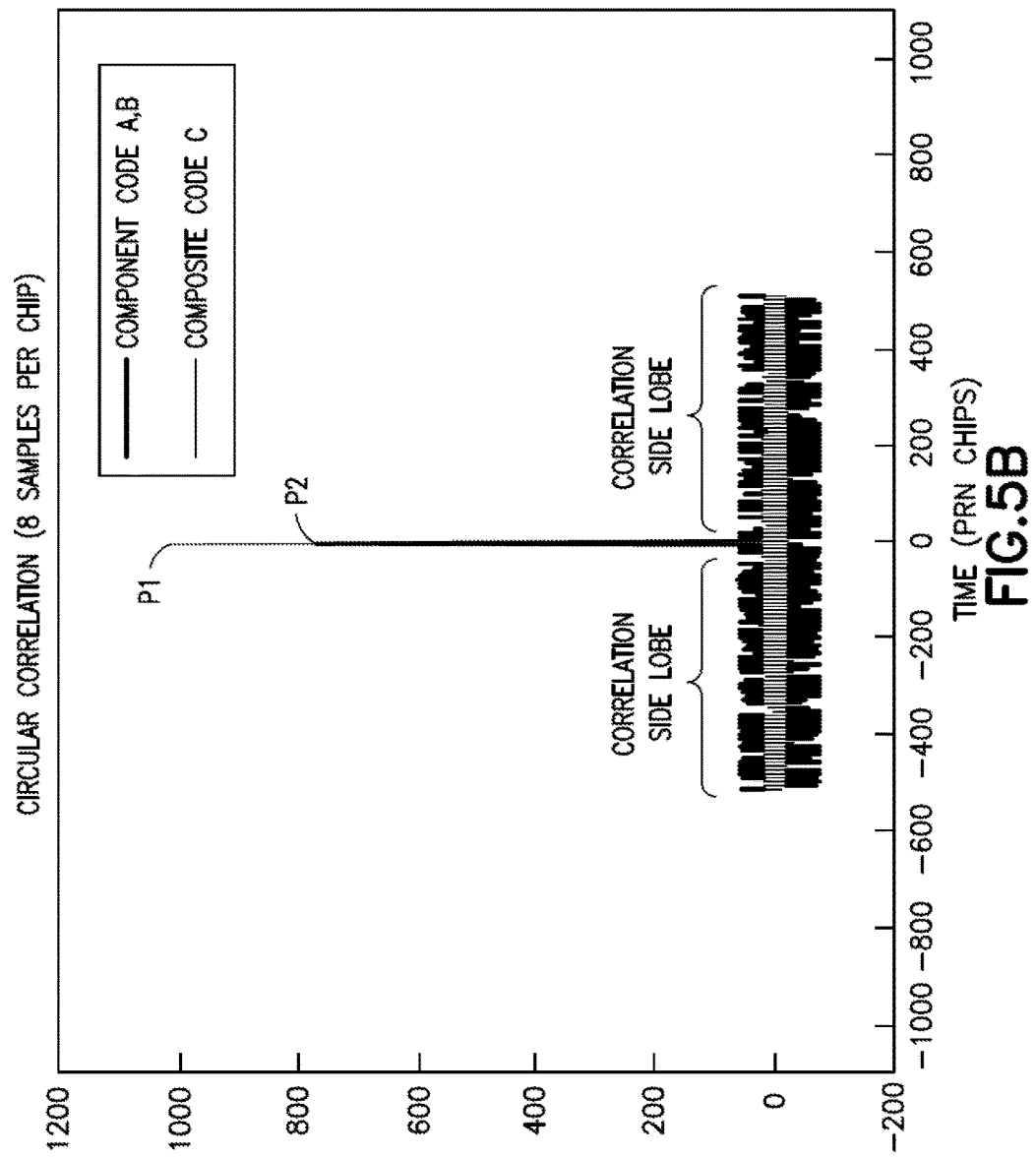

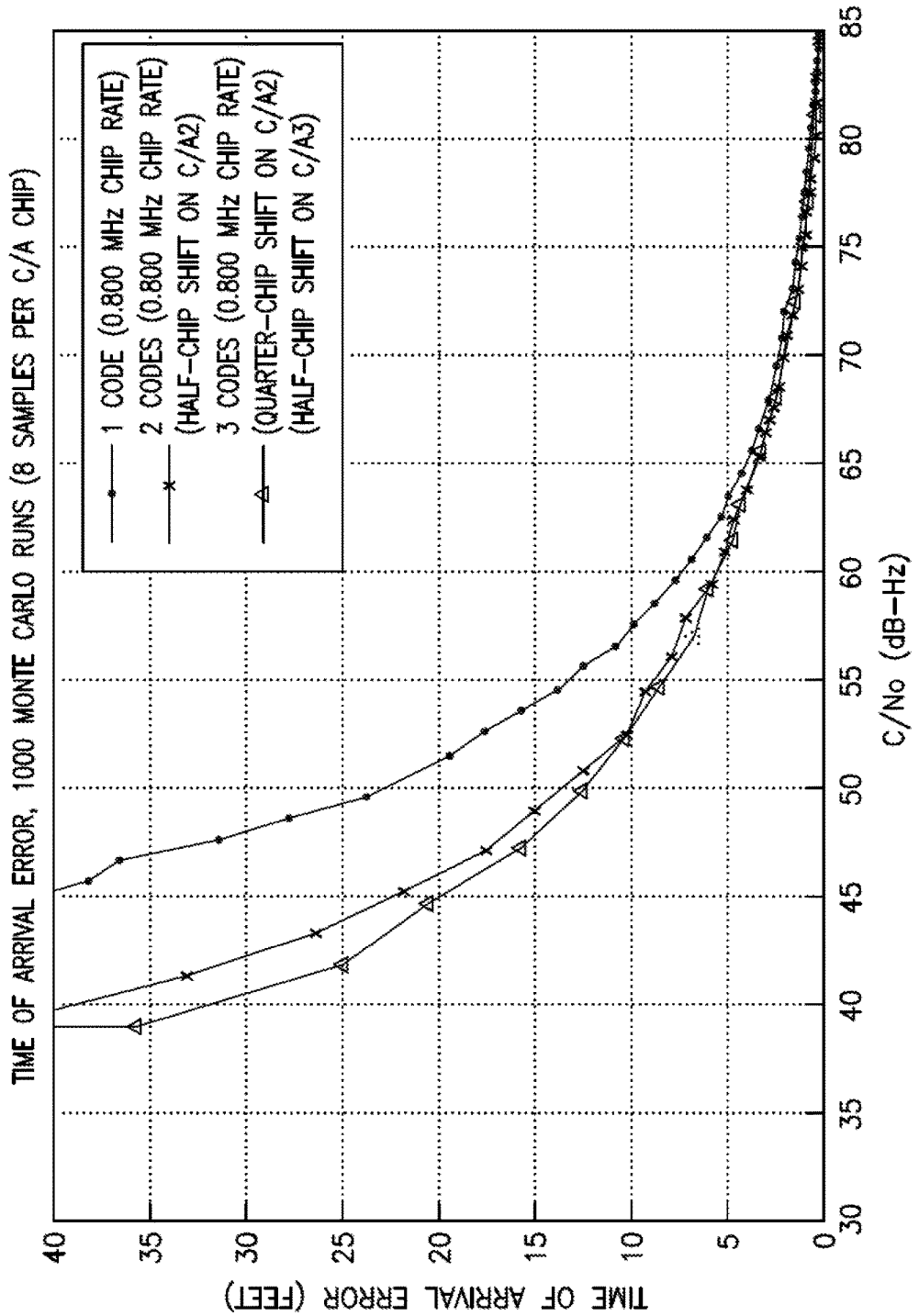

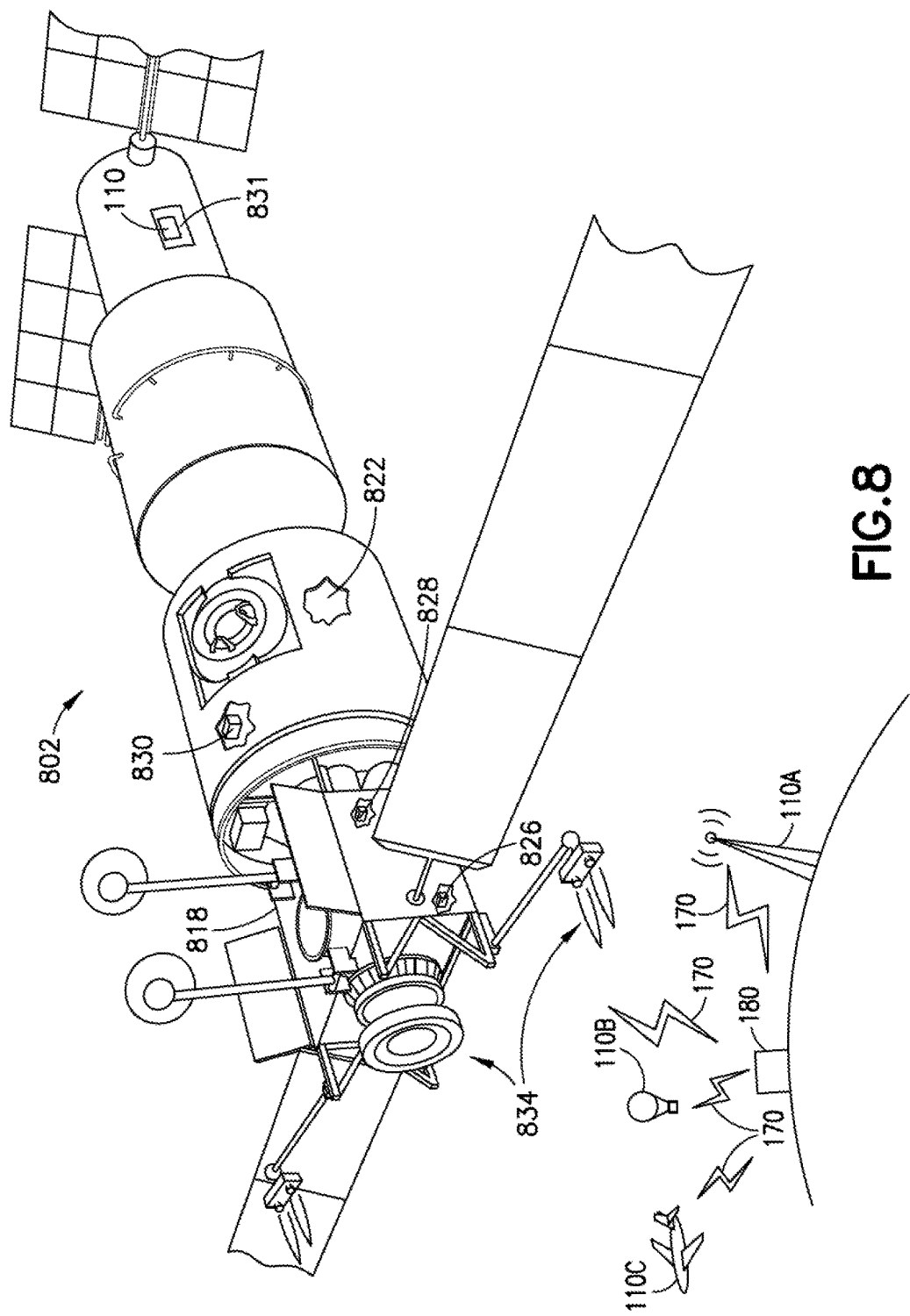

SYSTEM AND METHOD FOR RANGING A PRN RECEIVER WITH A PRN COMPOSITE CODE

FIELD

The aspects of exemplary embodiment generally relate to improving ranging accuracy, more particularly, to improving ranging accuracy for PRN receivers with a PRN composite code.

BACKGROUND

Pseudorandom Noise (PRN) codes are often employed as ranging codes in systems where it is desirable to determine the range or distance a PRN receiver is from a PRN transmitter. Typically, the range or distance between the PRN transmitter and PRN receiver is determined based on the data carried by the PRN codes. While PRN codes themselves do not have information for range determination, PRN codes are the means for the PRN receiver to determine the ranging accuracy. Typically, systems that employ PRN codes as ranging codes do so by finding the ranging codes of a PRN transmitter by receiving the ranging code with a PRN receiver and correlating the ranging code with a local replica within the PRN receiver. Such systems include, for example, Code Division Multiple Access (CDMA) based navigation systems such as, for example, global positioning systems (GPS), other Global Navigation Satellite Systems (GNSS), positioning systems (such as the Russian GLONASS system), or pseudolites (for example, a terrestrial positioning system using fixed ranging code transmission towers, or aerial positioning systems using balloons or manned or unmanned aircraft). In other aspects, such systems also include, for example, CDMA-based communications systems or Time Division Multiple Access (TDMA) based communication systems configured to use PRN ranging signals.

Conventional systems using PRN codes for ranging purposes generally are based on the PRN receiver's ability to correlate a received PRN code from the PRN transmitter with a local replica (stored or generated by the PRN receiver). When a PRN code is transmitted by the PRN transmitter and received by the PRN receiver and correlated by the PRN receiver with a local replica, the PRN receiver is able to determine an estimate of range between the PRN receiver and the PRN transmitter (determined by correlating the PRN code with the local replica) as well as any Doppler effects on the received PRN code. The characteristics of correlation between a received PRN code and a local replica are greatly influenced by the chip rate of the PRN code which is sent. Typically, a higher chip rate (e.g. a rate at which the PRN code chips transition) of a PRN code will provide for greater ranging accuracy and better time of arrival error estimation because there is a sharper autocorrelation peak that is generated when correlating the received PRN code with a local replica. However, in conventional systems, there are also significant drawbacks to employing a PRN code with a higher chip rate. First, PRN codes with higher chip rates require greater signal bandwidth. Further, conventional PRN receiver hardware typically includes a filter or pre-filter intended to attenuate noise and/or interfering signals outside that bandwidth. However, this filtering will inherently filter part of the received PRN code's bandwidth and unintentionally reduce signal resolution. This has the intrinsic effect of filtering out the high frequency components of PRN codes of high chip rates. This filtering performed by PRN receivers render higher chip rate PRN codes ineffective since the higher frequency components of the PRN code with higher chip rates are typically filtered out.

SUMMARY

Accordingly, a system and method, intended to address the above-identified concerns, would find utility.

In accordance with one or more aspects of the present disclosure, a method for improving ranging accuracy of a PRN receiver includes generating, at a PRN transmitting device that includes a processor and wireless transmitter that is in a line-of-sight position with the PRN receiver, at least two component codes, time shifting, with the processor of the PRN transmitting device, the at least two component codes relative to each other to form time shifted component codes, wirelessly transmitting, with the PRN transmitting device, the time shifted component codes to the PRN receiver with a predetermined modulation, and receiving the time shifted component codes with the PRN receiver that includes a PRN receiver processor, and determining a range estimate of the PRN receiver based on a combination of the time shifted component codes with the PRN receiver processor.

In accordance with one or more aspects of the present disclosure, a method for improving ranging accuracy of a PRN receiver includes wirelessly receiving time shifted component codes with the PRN receiver having a PRN receiver processor, where the time shifted component codes include at least two component codes that are received substantially simultaneously by the PRN receiver, combining, with the PRN receiver processor, the at least two component codes of the time shifted component codes into a composite code by performing an exclusive OR operation on the at least two component codes, and determining a range estimate of the PRN receiver and a PRN transmitting device based on the composite code with the PRN receiver processor.

In accordance with one or more aspects of the present disclosure, a PRN receiver ranging and tracking system includes a PRN receiver having a PRN processor configured to wirelessly receive time shifted component codes, where the time shifted component codes include at least two component codes that are received substantially simultaneously by the PRN receiver, combine the at least two component codes of the time shifted component codes into a composite code with an exclusive OR operation module on the at least two component codes, and determine a range estimate of the PRN receiver to a PRN transmitting device based on the composite code.

BRIEF DESCRIPTION OF THE DRAWINGS

Figure 1A:
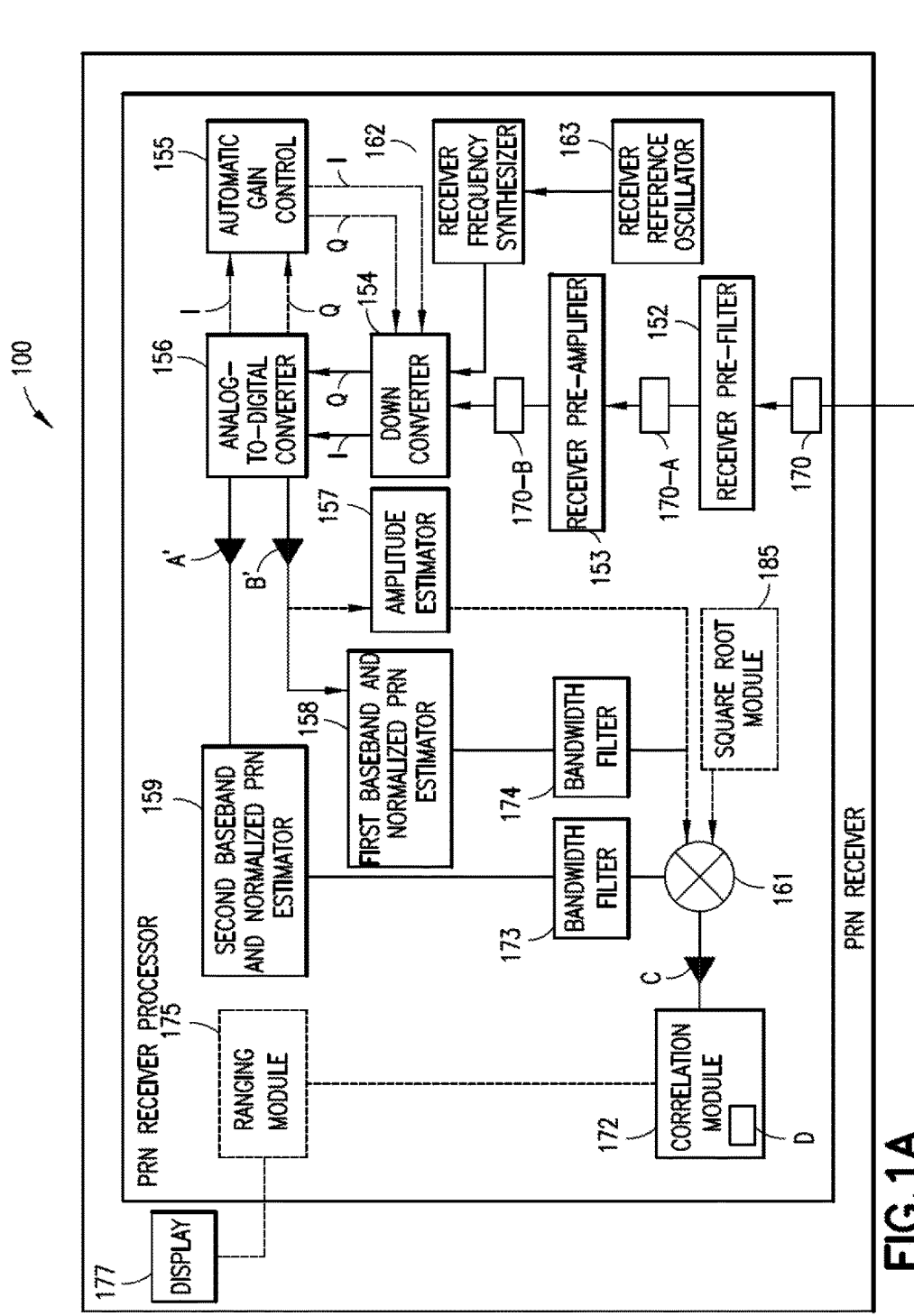
Figures 1, 1A, 2:
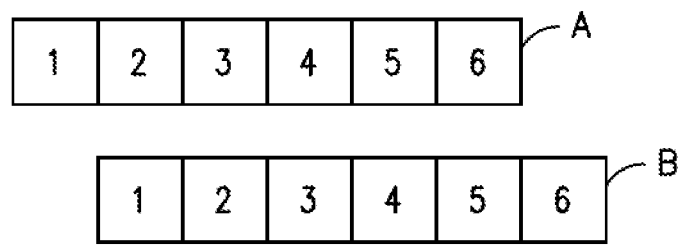
Figures 1, 1B, 2:
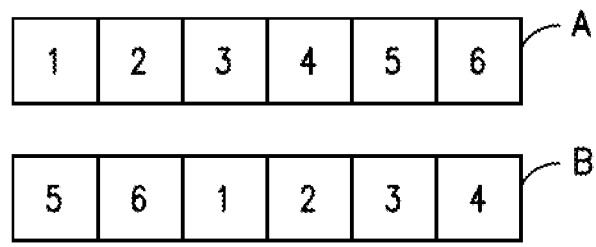
Figure 2:
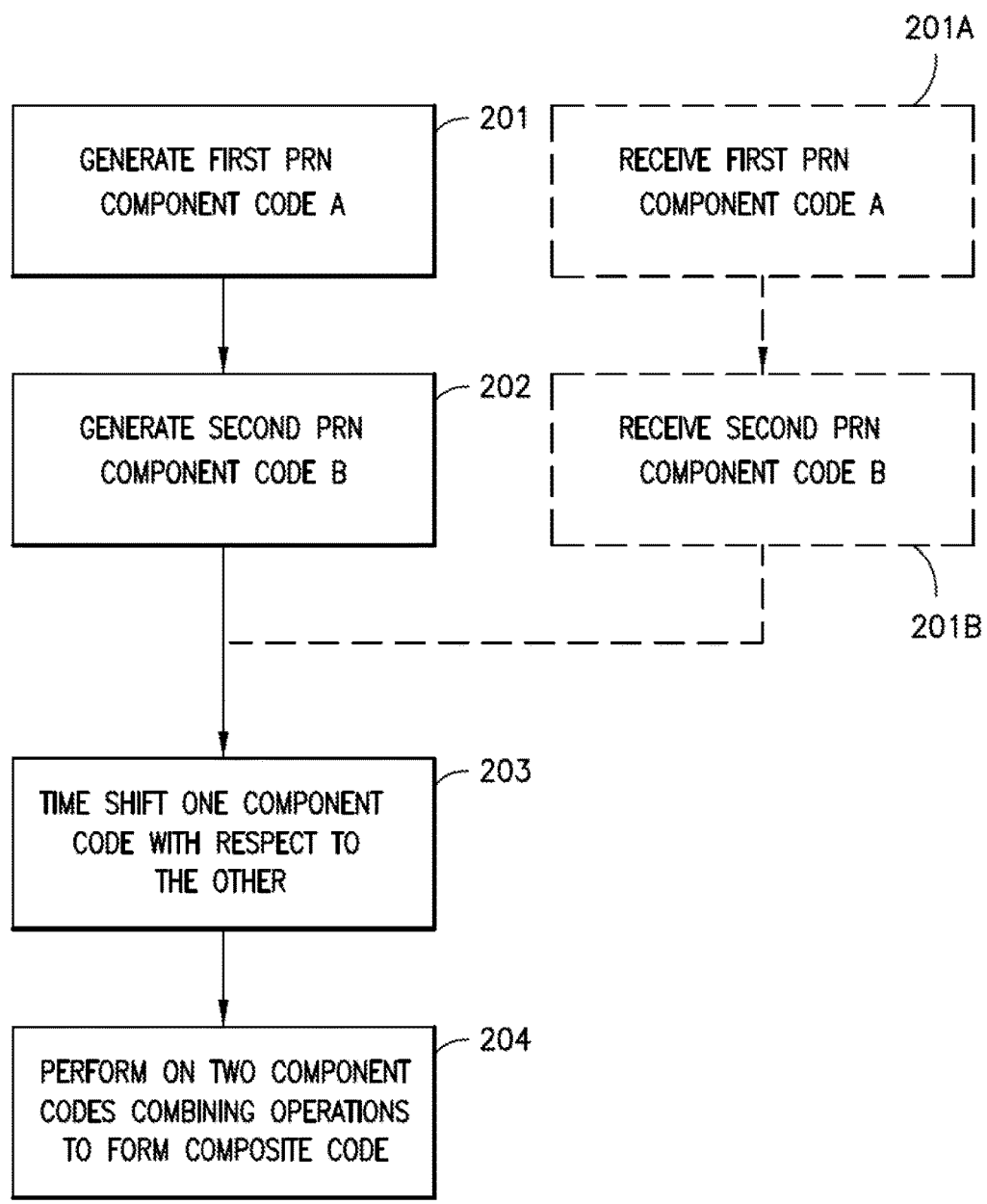
Figure 3A:
Figure 3B:
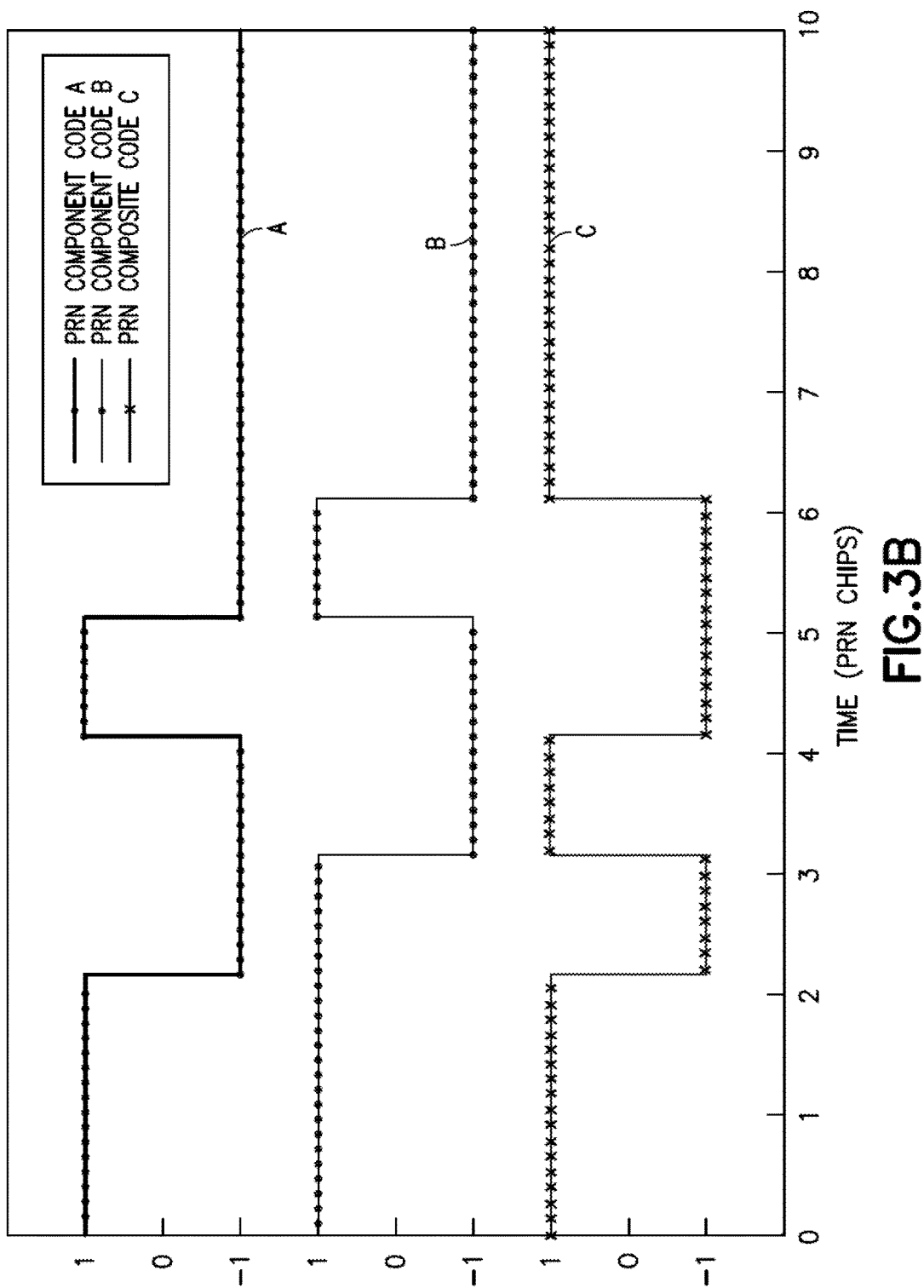
Figure 4:
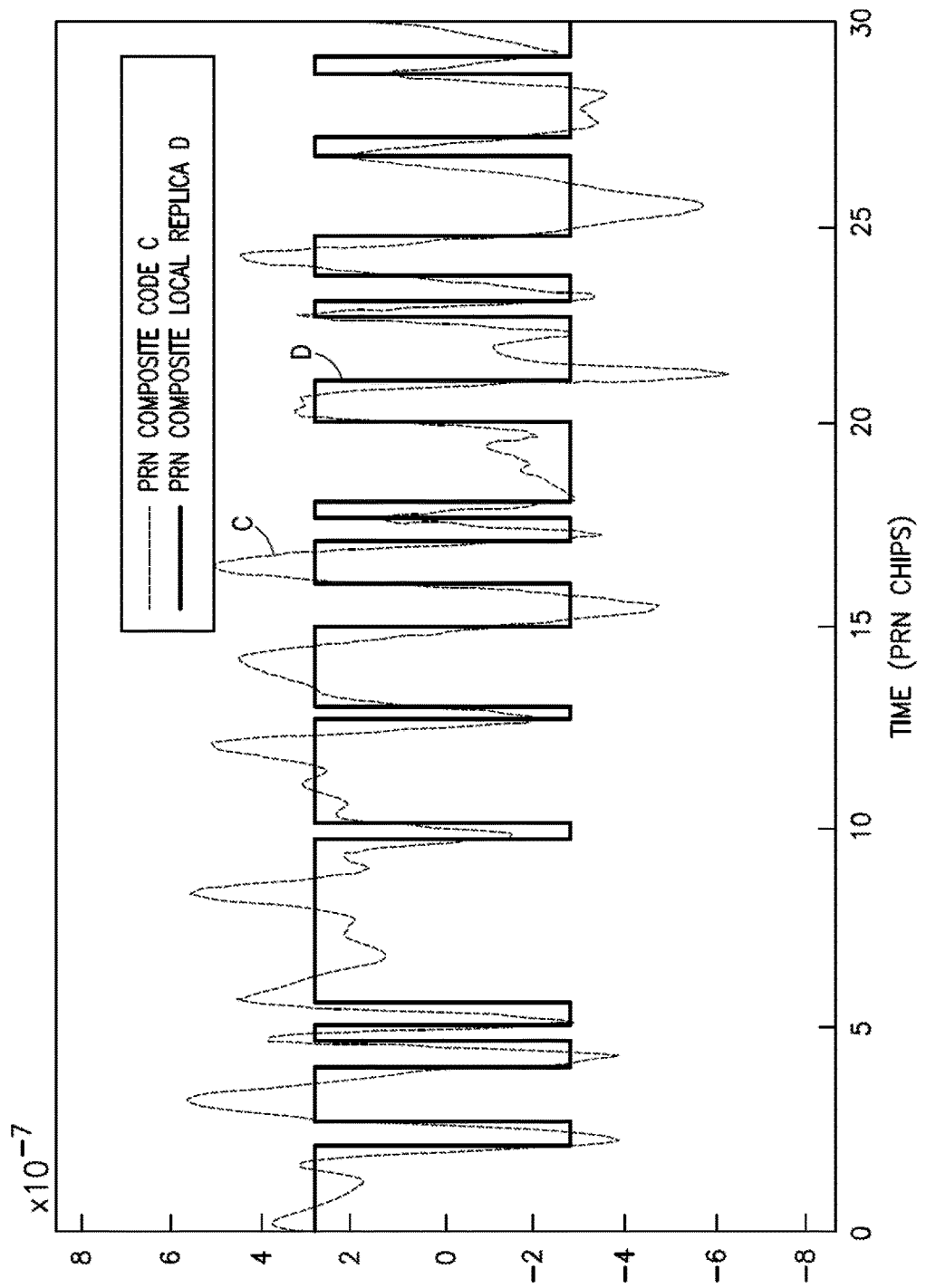
Figure 5A:
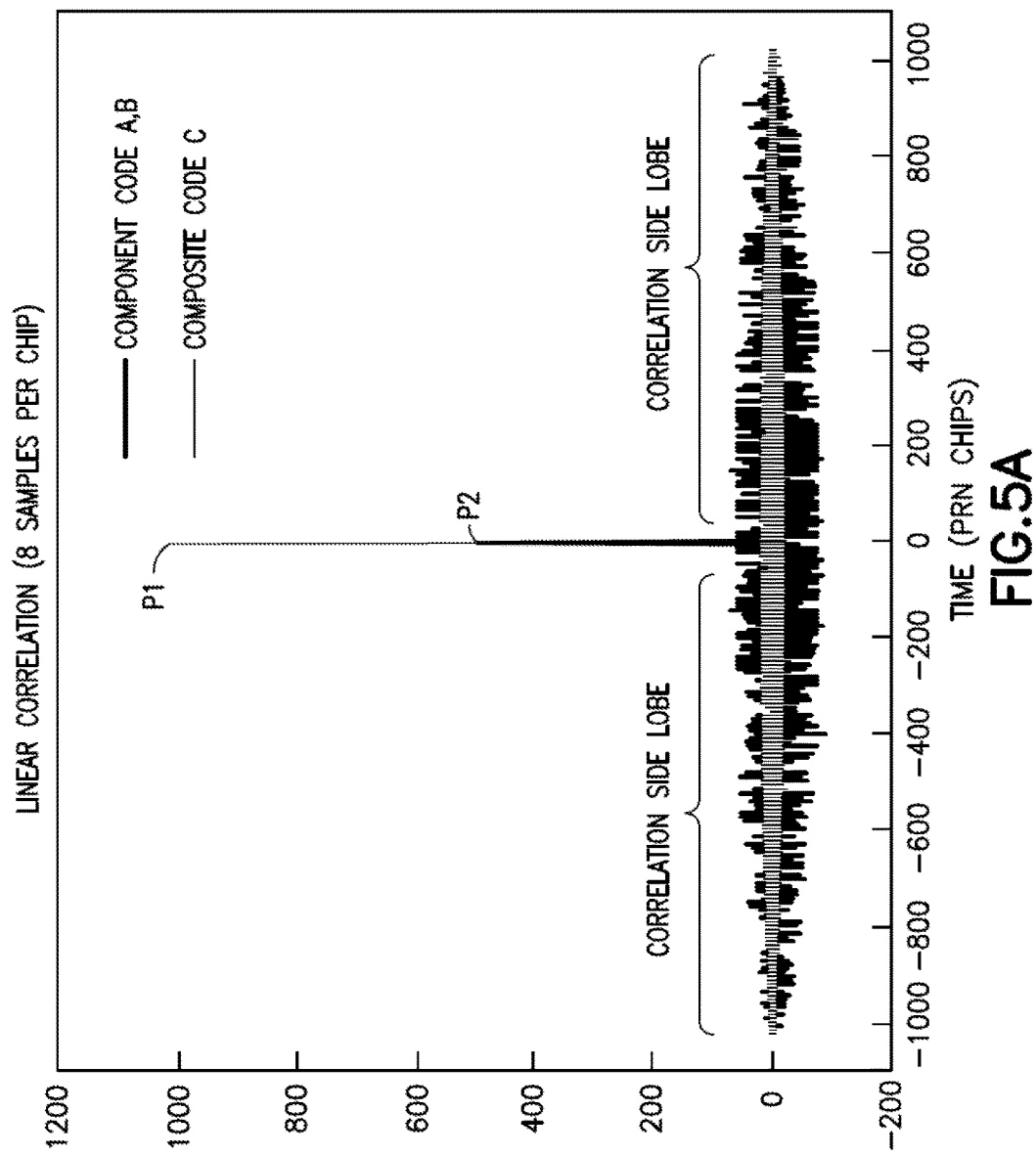
Figure 5C:
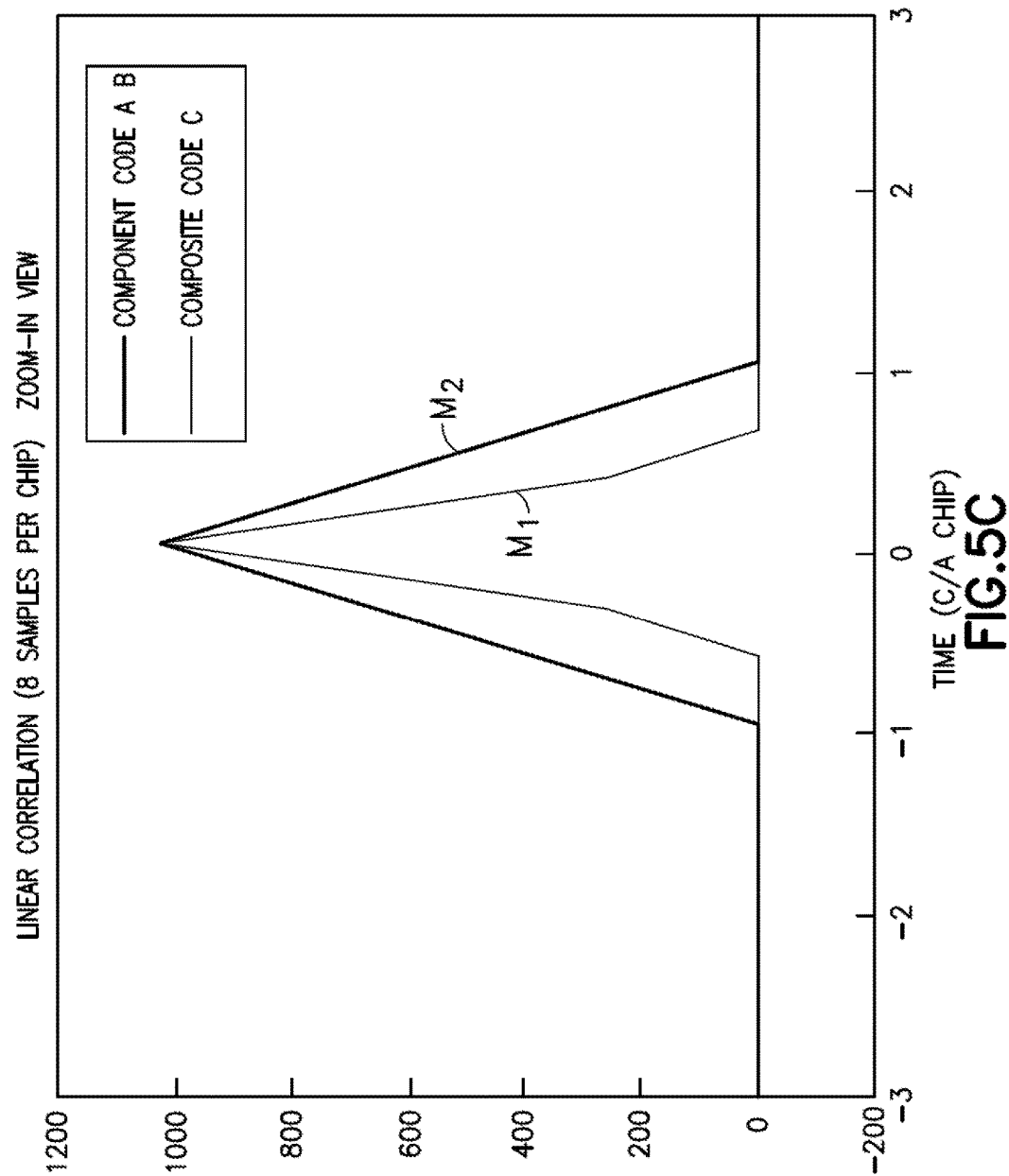
Figure 5D:
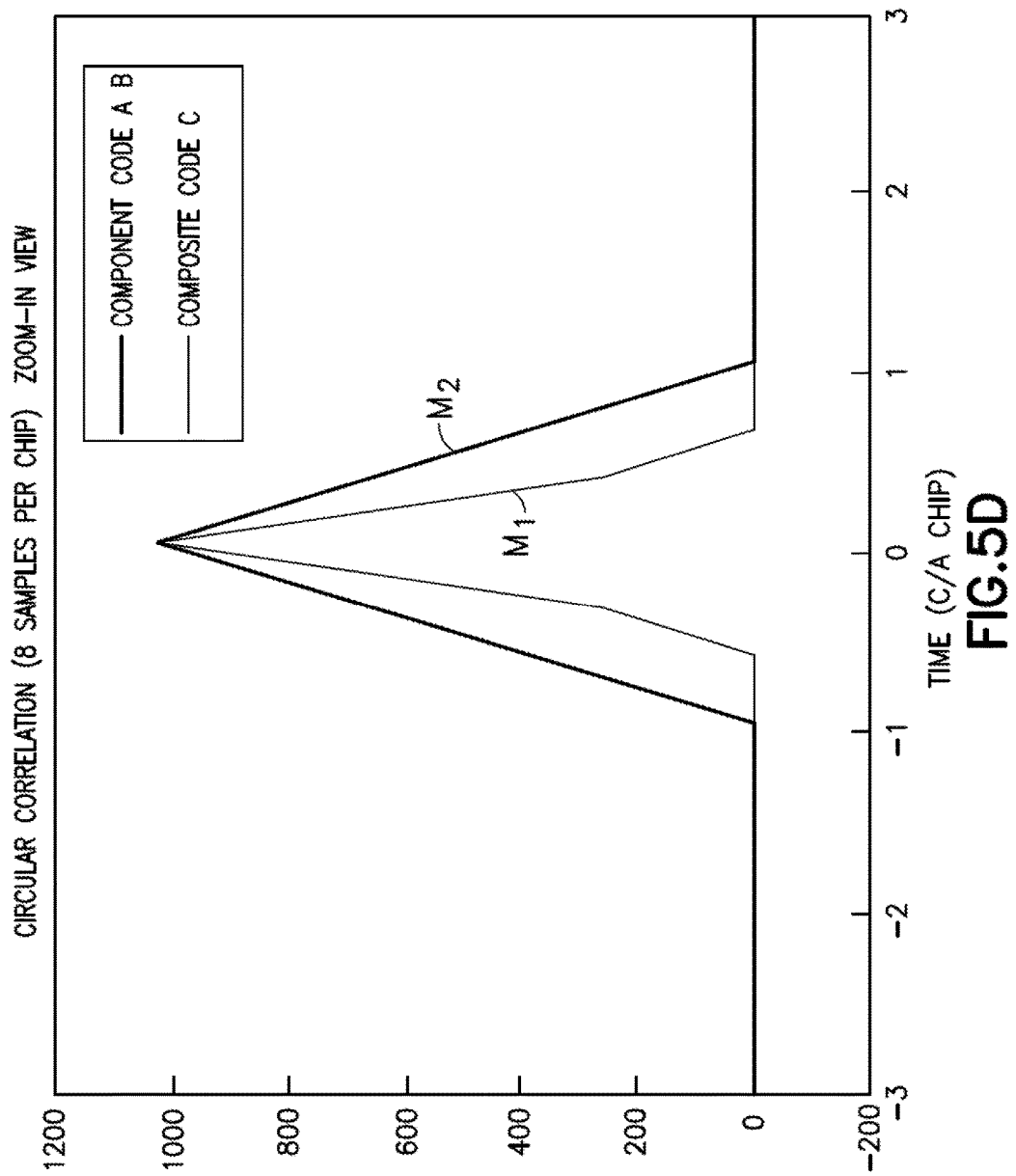
Figure 6A:
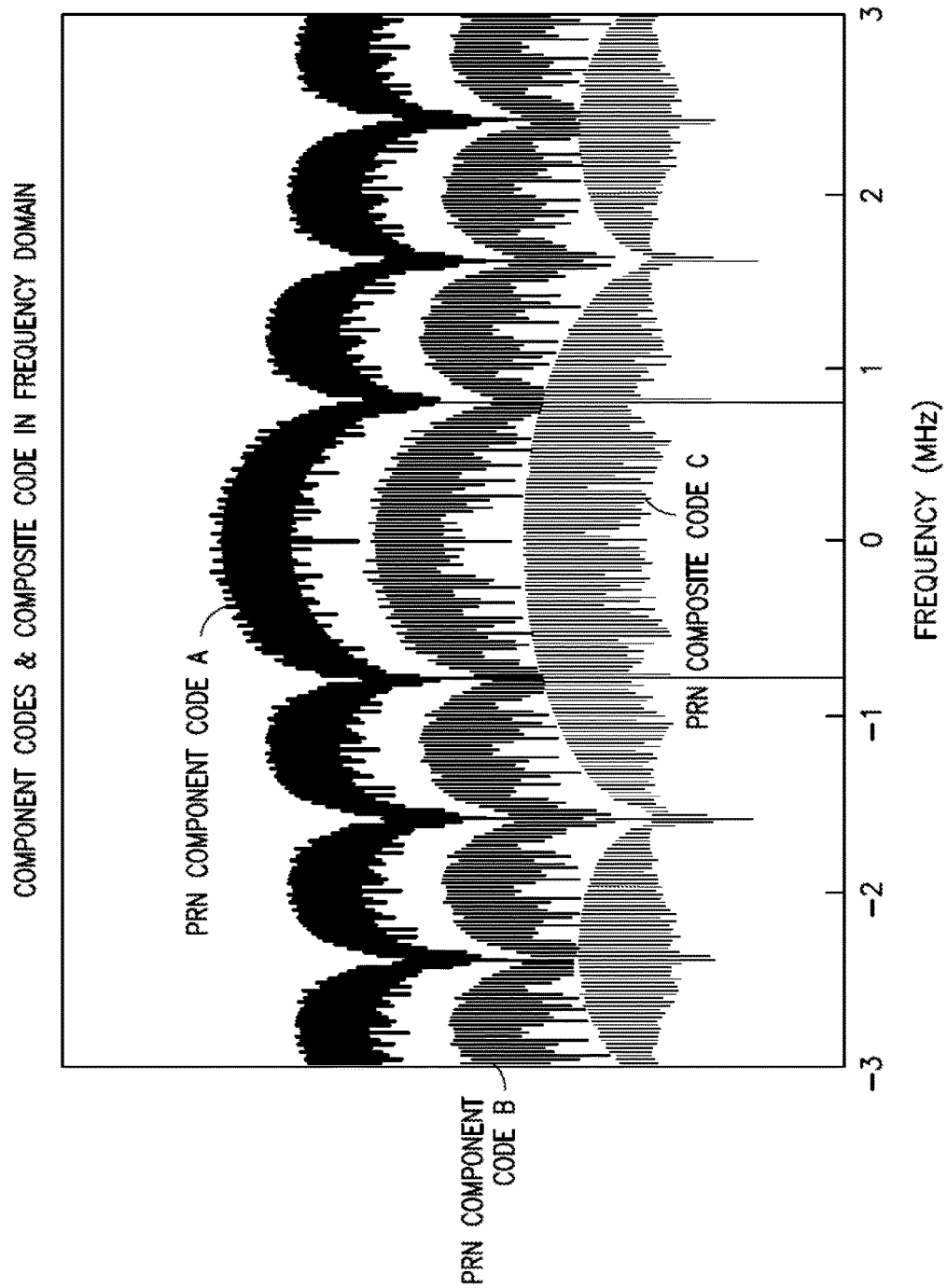
Figure 6B:
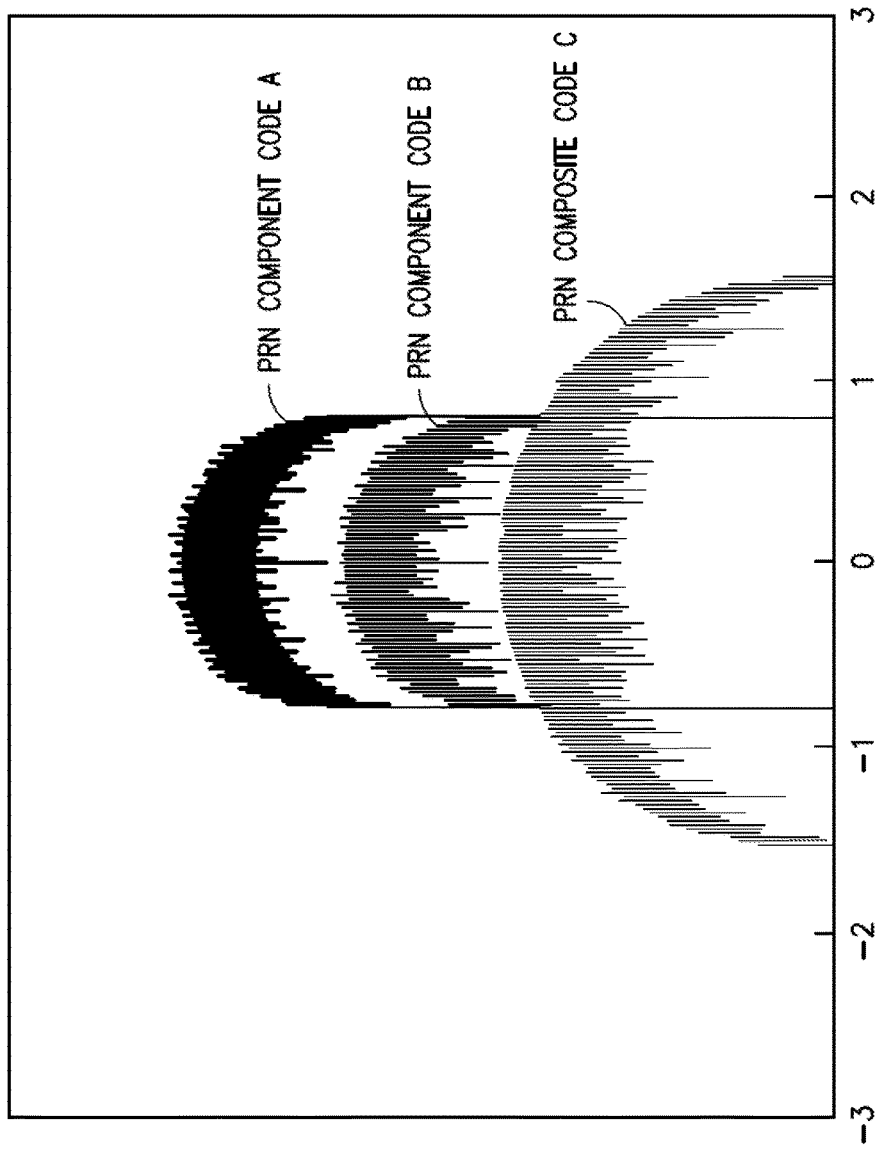
Figure 6C:
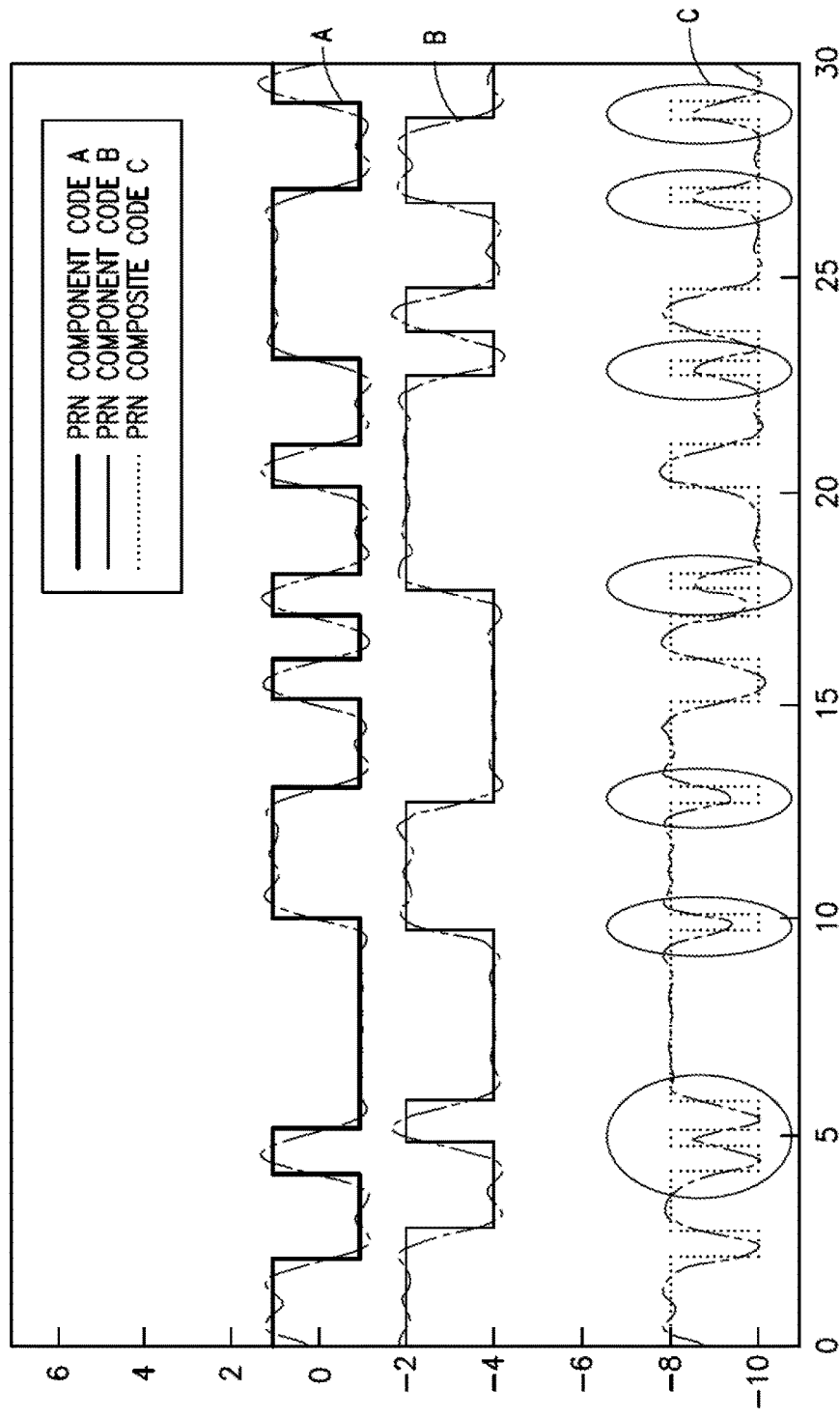
Figure 7A:
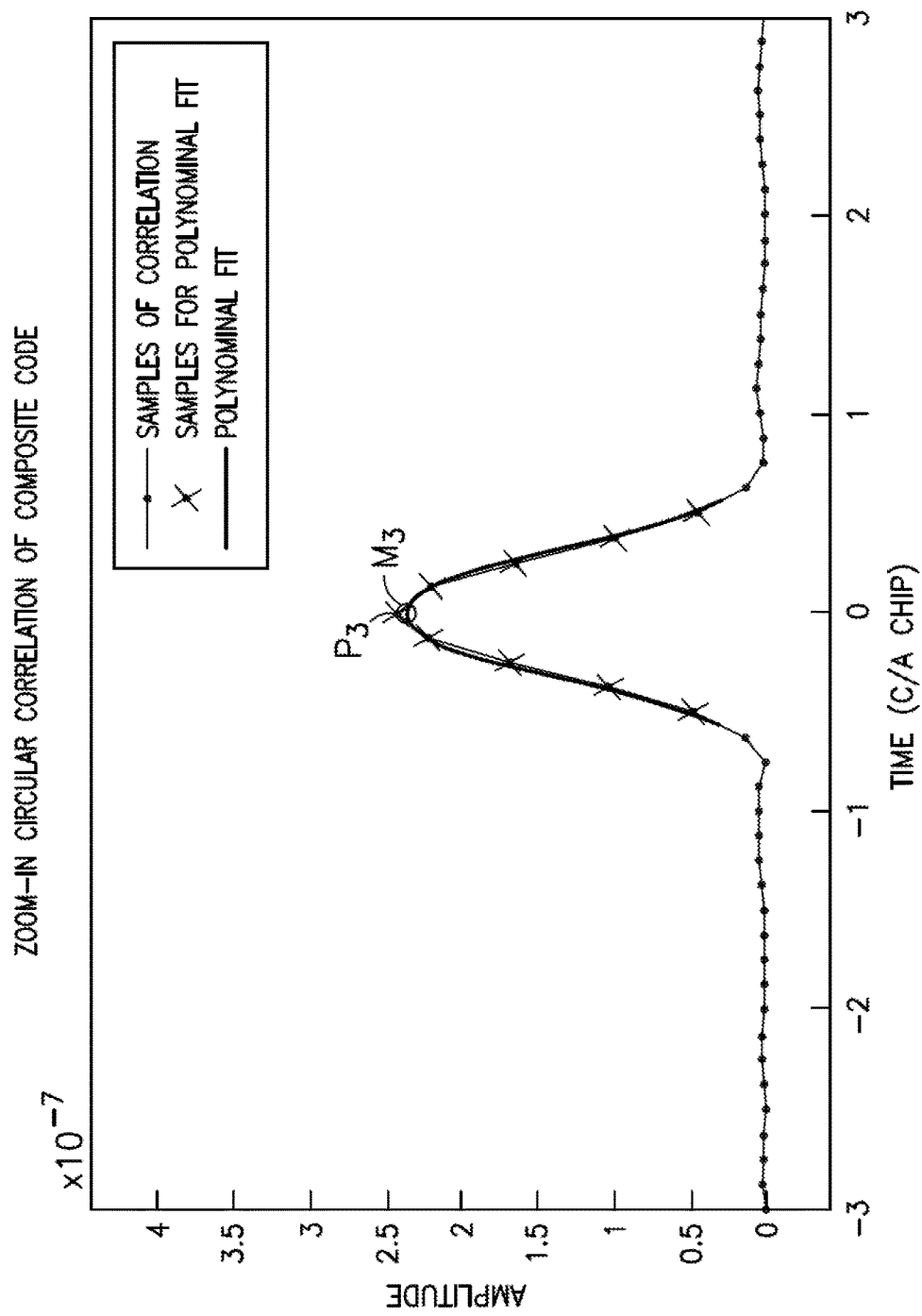
Figure 7B:
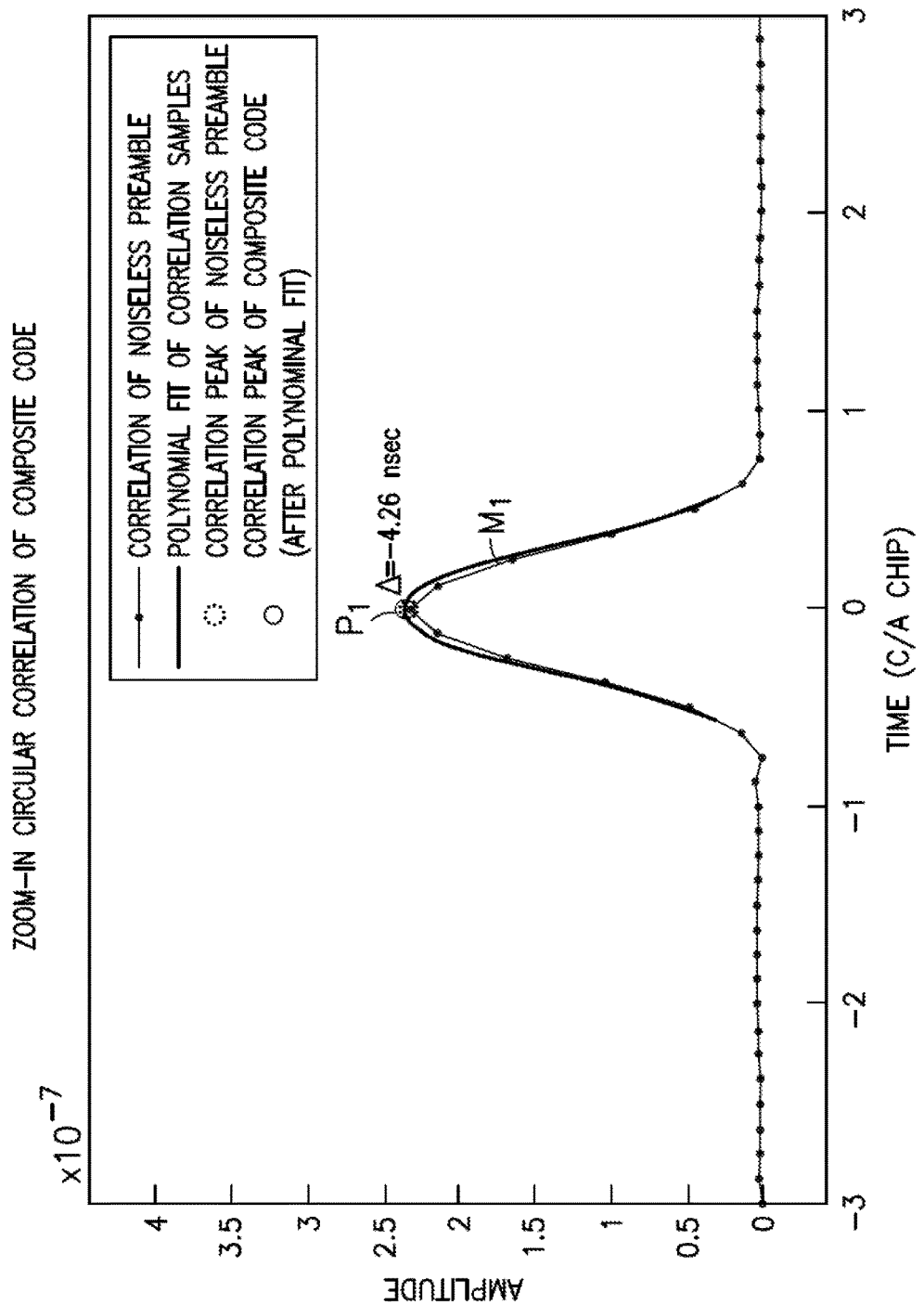

Having thus described examples of the disclosure in general terms, reference will now be made to the accompanying drawings, which are not necessarily drawn to scale, and wherein like reference characters designate the same or similar parts throughout the several views, and wherein:

FIG. 1(1A-1B) is an exemplary block diagram of a PRN ranging system according to aspects of the present disclosure;

FIGS. 1A-2 and 1B-2 are exemplary diagrams illustrating time-shifting operations of PRN component codes according to aspects of the present disclosure;

FIG. 2 is an exemplary flow diagram of the operation of the PRN ranging system according to aspects of the present disclosure;

FIG. 3A is an exemplary diagram illustrating a compositing operation of PRN component codes according to aspects of the present disclosure;

FIG. 3B is an exemplary diagram illustrating a compositing operation of PRN component codes according to aspects of the present disclosure;

FIG. 4 is an exemplary diagram illustrating a correlation operation of PRN composite codes according to aspects of the present disclosure;

FIGS. 5A-5B are exemplary diagrams illustrating correlation peaks and sidelobes of PRN composite codes and PRN component codes according to aspects of the present disclosure;

FIGS. 5C-5D are exemplary diagrams illustrating correlation peaks and sidelobes of PRN composite codes and PRN component codes according to aspects of the present disclosure;

FIGS. 6A-6B are exemplary diagrams illustrating the effective bandwidth of PRN composite codes and PRN component codes according to aspects of the present disclosure;

FIG. 6C is an exemplary diagram illustrating the effective chip rates of PRN composite codes and PRN component codes according to aspects of the present disclosure;

FIGS. 7A-7C are an exemplary diagrams illustrating time of arrival error estimation according to aspects of the present disclosure;

FIG. 8 is a schematic illustration of a spacecraft according to aspects of the present disclosure.

In the block diagram(s) referred to above, solid lines, if any, connecting various elements and/or components may represent mechanical, electrical, fluid, optical, electromagnetic and other couplings and/or combinations thereof. As used herein, "coupled" means associated directly as well as indirectly. For example, a member A may be directly associated with a member B, or may be indirectly associated therewith, e.g., via another member C. Couplings or connections other than those depicted in the block diagrams may also exist. Dashed lines, if any, connecting the various elements and/or components represent couplings or connections similar in function and purpose to those represented by solid lines; however, couplings or connections represented by the dashed lines may either be selectively provided or may relate to alternative or optional aspects of the disclosure. Likewise, elements and/or components, if any, represented with dashed lines, indicate alternative or optional aspects of the disclosure. Environmental elements, if any, are represented with dotted lines.

In the block diagram(s) referred to above, the blocks may also represent operations and/or portions thereof. Lines connecting the various blocks do not imply any particular order or dependency of the operations or portions thereof.

DETAILED DESCRIPTION

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting. It is further noted that all numbers, temperatures, etc. are "about" and provided for exemplary purposes only. All specific numbers, temperatures and any other specific information may be more or less or any suitable number or temperature.

Reference herein to "one example" or "one aspect" means that one or more feature, structure, or characteristic described in connection with the example or aspect is included in at least one implementation. The phrase "one example" or "one aspect" in various places in the specification may or may not be referring to the same example or aspect.

Referring now to FIG. 1(1A-1B), in one aspect of the present disclosure, a PRN receiver ranging system 100 provides for a higher effective chip rate in a PRN composite code C assembled from a first PRN component code A and a second PRN component code B. In one aspect, the PRN codes described herein include Coarse Acquisition (C/A) codes used in GPS applications by GPS receivers and transmitters. However, in other aspects, the PRN codes include any suitable ranging signal, including those employed in, for example, CDMA or TDMA-based communications systems, GNSS positioning systems, and/or pseudolites using PRN codes for ranging purposes.

The PRN receiver ranging system 100 provides for a PRN composite code C of higher effective chip rate by combining more than one PRN component code A, B of lower effective chip rates with a PRN receiver as described herein. Please note that while two PRN codes are combined in the examples given herein, in other aspects, more than two PRN codes may be combined in the manner described herein to achieve a higher effective chip rate. The PRN composite code C behaves like a PRN code of a higher effective chip rate and may provide the benefit of a PRN code having the higher effective chip rate when operating under conditions of transmitting all PRN component codes on a single (common) carrier signal at a relatively high C/No (carrier power over noise density) and the PRN receivers have sufficiently high sampling rates to substantiate the higher effective chip rate of the PRN composite code. Alternatively, the PRN component codes can be sent on different carriers where the delay between the different carriers is controlled within a predetermined tolerance so that the different PRN component codes arrive at the PRN receiver with a predetermined temporal order. In one aspect, the PRN composite code may also have characteristics such as, for example a narrower null-to-null correlation mainlobe, more accurate tracking error/lower time-of-arrival (TOA) errors, and enhanced correlation properties with a greater ratio between a correlation peak and the correlation sidelobes of a PRN composite code than the ratio between the correlation peak and correlation sidelobes of any one of the PRN component codes individually. Further, the PRN composite code C, once assembled, may not require greater signal bandwidth or higher frequency carrier signals, and is not filtered out by the pre-filter of the PRN receiver (e.g. passes through the pre-filter).

Referring now to FIGS. 1, 1A-2, 1B-2 and 2, an exemplary block diagram of the PRN receiver ranging system 100 as well as an exemplary flow diagram of the operations of the PRN receiver ranging system 100 are shown. In one aspect, the PRN receiver ranging system 100 includes a PRN transmitter (or PRN transmitting device) 110 and a PRN receiver 150. The PRN transmitter 110 includes a PRN transmitter processor 111. In one aspect, the PRN transmitter processor 111 includes a first PRN generator 117 and a second PRN generator 118 which respectively generates a first PRN component code A and a second PRN component code B. In other aspects, the PRN transmitter processor 111 receives a first PRN component code A from a source 180 and a second PRN component code B from a source 181, where the first PRN component code A and the second PRN component code B are transmitted to the PRN transmitter 110 by the sources 180, 181 for time-shifting and transmission to the PRN receiver 150. In one aspect, the sources 180, 181 may be any suitable PRN component code source such as, e.g., GPS or global positioning satellites where the PRN transmitter 110 is terrestrially located or extra-terrestrially located. In one aspect, the PRN transmitter processor 111 further includes a chip shifter 116, a modulator 115, a transmitter pre-amplifier 112, a transmitter pre-filter 113, a transmitter up-converter 114, a transmitter frequency synthesizer 119, a transmitter reference oscillator 121 and a transmitter antenna 120.

The PRN receiver 150 includes a PRN receiver processor 151. The PRN receiver processor 151 further includes a receiver antenna 160, a receiver pre-filter 152, a receiver pre-amplifier 153, a down-converter 154, an analog-to-digital converter 156 and an automatic gain control 155. The PRN receiver processor 151 further includes a receiver frequency synthesizer 162, a receiver reference oscillator 163, a first baseband and normalized PRN estimator 158, a second baseband and normalized PRN estimator 159, an amplitude estimator 157, a square root module 185, a composite module 161, a correlation module 172, bandwidth filters 173, 174, and a ranging module 175. In one aspect, the PRN receiver 150 also includes a display 177 coupled to the PRN receiver processor 151 by way of the ranging module 175 and configured to display the range or solution of a PRN receiver 150 determined by the PRN receiver processor 151 and the ranging module 175 relative to the PRN transmitter 110. It should be understood that this is one exemplary aspect of the PRN transmitter 110 and the PRN receiver 150. In other aspects, the PRN transmitter 110 and PRN receiver 150 can have any suitable configuration.

In one aspect, the PRN transmitter 110 is configured to generate the first PRN component code A with the first PRN generator (see block 201 of FIG. 2) and the second PRN component code B with the second PRN generator 118 (see block 202 of FIG. 2) and transmit the first PRN component code A and the second PRN component code B to the PRN receiver 150. In other aspects, as noted above, the PRN transmitter 110 is configured to receive the first PRN component code A and second PRN component code B from sources 180, 181 (see blocks 201A, 202A of FIG. 2). In one aspect, while the PRN transmitter 110 is described as being configured to generate (or receive) the first and second PRN component codes A, B herein, it is understood that the PRN transmitter 110 is configured to generate any suitable number of PRN component codes or receive any suitable number of codes from any suitable number of sources (e.g. sources 180, 181).

In one aspect, the first PRN generator 117 and the second PRN generator 118 generate the first and second PRN component codes A, B based on the transmitter frequency synthesizer 119, which receives a reference oscillation from the reference oscillator 121. In one aspect, the second PRN component code B is communicated from the second PRN generator 118 (or source 181) to a chip shifter 116. The chip shifter 116 is configured to time-shift the second PRN component code B relative to the first PRN component code A (see block 203 of FIG. 2) by a predetermined amount of time (measured in the form of chip fraction) to form the time-shifted second PRN component code B. In one aspect, the first and second PRN component codes A, B is transmitted to the PRN receiver 150 by the PRN transmitter 110 periodically according to a predetermined period (for example, once per second, or once per half-second or any other suitable predetermined time period). Where the first and second PRN component codes A, B are transmitted periodically, the chip shifter 116 is configured to linearly time-shift the second PRN component code B relative to the first PRN component code A. Each chip of the second PRN component B is delayed or advanced by the same predetermined time offset relative to a corresponding chip of the first PRN component code A (see FIG. 1A-2, where the second PRN component code B is time-shifted one chip relative to the first PRN component code A). In other aspects, the first and second PRN component codes A, B are transmitted to the PRN receiver 150 by the PRN transmitter 110 continuously. Where the first and second PRN component codes A, B are transmitted continuously, the chip shifter 116 is configured to circularly time-shift the second PRN component code B relative to the first PRN component code A (see FIG. 1B-2, where the second PRN component code is circularly time-shifted 2 chips relative to the first PRN component code A). Alternatively, the PRN component codes A, B may be shifted relative to one another in any suitable manner.

In one aspect, the first PRN component code A and the second PRN component code B (which is time-shifted relative to the first PRN component code A as described herein) are communicated to a modulator 115, where they are modulated into a common carrier signal 170. In one aspect, the modulator 115 is a phase-shift key modulator, including, for example, a quadrature phase-shift key modulator (QPSK modulator). In other aspects, the modulator 115 can modulate the first and second PRN component codes A, B through any suitable modulation techniques including, but not limited to, for example, other phase-shift key modulations. In one aspect, the modulation of the first and second PRN component codes A, B by the modulator 115 corresponds to a targeted bandwidth of the PRN receiver 150. In other aspects, the first PRN component code A and second PRN component code B are modulated into different carrier signals, assuming that the delay between different carrier signals are controlled within the predetermined tolerance as noted herein.

In one aspect, after the modulator 115 modulates the first and second PRN component codes A, B into the carrier signal 170, the carrier signal 170 is communicated from the modulator 115 to the transmitter up-converter 114. In one aspect, the transmitter up-converter 114 is configured to up-convert the carrier signal 170 to a predetermined frequency for transmission. In one aspect, the carrier signal 170 is communicated to the transmitter pre-filter 113. The transmitter pre-filter 113 is configured to filter a predetermined set of higher or lower frequency components of the carrier signal 170, for example, to attenuate noise and/or interfering signals outside that bandwidth. In one aspect, the carrier signal 170 is transmitted to a transmitter pre-amplifier 112. The transmitter pre-amplifier 112 is configured to amplify the carrier signal to a predetermined level.

The PRN transmitter 110 transmits the carrier signal 170 including the first and second PRN component codes A, B via the transmitter antenna 120. In one aspect, the transmitter antenna 120 is a GPS or GNSS satellite or pseudolite antenna. In other aspects, the transmitter antenna 120 is the broadcast antenna of a CDMA or TDMA communication system tower. In yet other aspects, the transmitter antenna 120 is any suitable transmitter which is in a line of sight position with the PRN receiver 150. In one aspect, the transmitter antenna 120 is configured to transmit the carrier signal 170 on a common carrier with a predetermined carrier power over noise density. Here, because the first and second PRN component codes A, B are transmitted as part of the same carrier signal 170, the first and second PRN component codes A, B are based on the same time reference so there is no inherent unknown time error or unknown time bias between the first and second PRN component codes A, B. It is further understood that, in one aspect, the first and second PRN component codes A, B may have different chip rates and will be received at substantially the same time by the PRN receiver 150. In other aspects, the transmitter antenna 120 is configured to transmit different carrier signals, each including a first or second PRN component code A, B, where the time delay between the different carrier signals is controlled as described herein.

Referring still to FIGS. 1(1A-1B)-2 and also FIGS. 3A-3C, the PRN receiver 150 is configured to receive, with the receiver antenna 160, the carrier signal 170 including the first and second PRN component codes A, B from the transmitter antenna 120 and is further configured to assemble the PRN composite code C based on the first and second PRN component codes A, B. In one aspect, the carrier signal 170 is received by the receiver antenna 160 and communicated to the receiver pre-filter 152. In one aspect, the receiver pre-filter 152 is configured to filter out the higher frequency components of the carrier signal 170, resulting in an attenuated carrier signal 170A. In other aspects, the receiver pre-filter 152 is also configured to filter out some lower frequency components of the carrier signal 170. In one aspect, the receiver pre-filter 152 filters the noise or distortion that is introduced into the carrier signal 170 during transmission from the transmitter antenna 120 to the receiver antenna 160. In other aspect, the receiver pre-filter 152 is also configured to filter out the sidelobes of the carrier signal 170.

In one aspect, the attenuated carrier signal 170A from the receiver pre-filter 152 is communicated to the receiver pre-amplifier 153. The receiver pre-amplifier 153 is configured to amplify the attenuated carrier signal 170A to a predetermined level. In one aspect, the attenuated and amplified carrier signal 170B is communicated from the receiver pre-amplifier 153 to the down-converter 154. In one aspect, the down-converter 154 is configured to convert the attenuated (e.g. band-limited) and amplified carrier signal 170B to baseband channels I and Q. In one aspect, the down-converter 154 is configured to down-convert the attenuated and amplified carrier signal 170B to the baseband channels I and Q based on the receiver frequency synthesizer 162, which is in communication with a receiver reference oscillator 163, which is configured to provide a reference oscillation for the receiver frequency synthesizer 162 for the frequency of the baseband I and Q.

In one aspect, the analog-to-digital converter 156 is configured to receive the baseband channels I and Q from the down-converter 154. In one aspect, the analog-to-digital converter 156 converts the baseband channels I and Q to a received first PRN component code A' and a received second PRN component code B' respectively. The received first PRN component code A' and received second PRN component code B' correspond to the first and second PRN component codes A, B with noise introduced during the transmission of the carrier signal 170 from the transmitter antenna 120 to the receiver antenna 160. In one aspect, the analog-to-digital converter 156 is also in communication with the automatic gain control 155 to equalize the baseband channels I and Q so as to provide a constant output of the received first and second PRN component codes A' and B' over a wide variety of input levels. The received first and second PRN component codes A' and B' are sent to a respective first and second baseband and normalized PRN estimator 158, 159 which are configured to estimate the baseband and normalize the received first and second PRN component codes A' and B' where, in one aspect, the received first and second PRN component codes A' and B' are filtered with bandwidth filters 173 and 174.

In one aspect, the first and second received PRN component codes A' and B' are communicated from the respective first and second baseband and normalized PRN estimator 158, 159 to the composite module 161 which is configured to assemble the received first and second PRN component codes A' and B' into the PRN composite code C (see block 204 of FIG. 2). In one aspect, the composite module 161 is configured to perform an exclusive OR (XOR) operation on the received first and second PRN component codes A' and B' on a point-to-point basis (e.g. on a sample-to-sample basis, according to the position of the chip number within the received first and second PRN component codes A' and B') to form the PRN composite code C. For example, referring to FIG. 3A, a mapping of two inputs and the output of the exclusive OR operation is shown. Since, for example, the chips of the received first and second PRN component codes A' and B' have amplitudes of either +1 or −1, the outcome of the exclusive OR function is equivalent to numerically multiplying both inputs. In one aspect, the exclusive OR operation of the received first and second PRN component codes A' and B' on a point-to-point basis is shown in FIG. 3B (where each point is a sample denoted by a dot). In other aspects, any suitable operation can be employed by the composite module 161 to assemble the received first and second PRN component codes A' and B' into the PRN composite code C. For example, the operations used by the composite module 161 can include NAND, NOR or other suitable mathematical or logical operations.

In one aspect, the composite module 161 can take into account other information in forming the PRN composite code C. For example, in one aspect, the composite module 161 can take into account the estimated amplitude of the received PRN component code A' from the amplitude estimator 157 and a square root module 185 (both shown in dashed lines in FIG. 1(1A-1B)) in forming the PRN composite code C. In one aspect, because the received first and second PRN component codes A' and B' are both normalized with respect to their amplitude, the PRN composite code C formed from the received first and second PRN component codes A' and B' will only have unit power and does not have the power of the first and second PRN component codes A and B. In one aspect, the amplitude estimator 157 and the square root module 185 are inputs for the composite module 161 to give the PRN composite code C the power that is the total power that comes with the carrier signal 170 including the first and second PRN component codes A, B.

Referring now to FIGS. 1(1A-1B) and 4, in one aspect, the PRN composite code C is communicated to a correlation module 172 to correlate the PRN composite code C generated by the composite module 161 with a local replica composite code D generated or stored by the correlation module 172 to determine a timing of the PRN composite code C (and, in effect, the received first and second component codes A' and B') relative to the local replica composite code D. In one aspect, the local replica composite code D corresponds to the PRN composite code C and is generated locally by the correlation module 172 in substantially the same manner as shown in FIG. 2, given that the first PRN component code A, the second PRN component code B and the time-shift of the second PRN component code B relative to the first PRN component code A are known to the correlation module 172. In one aspect, the correlation module 172 is configured to compare the local replica composite code D relative to the PRN composite code C until a correlation (e.g. a match) is determined.

As illustrated in FIG. 4, an example of the correlation between the PRN composite code C (which will have noise introduced by the transmission of the carrier signal 170) and the noiseless local replica composite code D is shown. In one aspect, the dashed line represents the PRN composite code C, which is curved because of bandwidth limiting from the receiver pre-filter 152 as well as noise introduced during the transmission of the carrier signal 170. The solid line represents the local replica composite code D (assuming an infinite bandwidth). In one aspect, the correlation module 172 is further configured to determine the accuracy of a time of arrival of the received first and second PRN component codes A' and B' based on the correlation of the PRN composite code C with the local replica composite code D. In one aspect, the correlation module 172 is further configured to communicate the correlation of the PRN composite code C with the local replica composite code D to the ranging module 175, which is configured to determine accuracy of a range or pseudorange (e.g. based on the time of arrival of the PRN composite code C) in any suitable manner, between the PRN receiver 150 and the PRN transmitter 110 based on the time of arrival of the received first and second PRN component codes A' and B'. In one aspect, the ranging module 175 is also configured to estimate the accuracy of time-of-arrival error as disclosed herein.

As noted above, the PRN composite code C has a higher effective chip rate than any one of the first and second PRN component codes A, B. Referring now to FIGS. 5A-5D and 6A-6C, the effect of the higher effective chip rate of the PRN composite code C relative to the lower chip rates of the first and second PRN component codes A, B is shown. In one aspect, as shown in the ellipse highlights in FIG. 6C for PRN composite code C, the chips for PRN composite code C have shorter period (e.g. narrower chips are sent within the same time periods) compared to the first and second PRN component codes A and B. In FIGS. 6A-6B, because the PRN composite code C has a higher effective chip rate, the PRN composite code C has a greater effective bandwidth relative to the first and second PRN component codes A, B. As shown in FIGS. 5C and 5D, the mainlobe of the PRN composite code C is narrower than the mainlobes of the first and second PRN component codes A, B, effectively providing for the wider effective bandwidth of the mainlobe of the PRN composite code C relative to any one of the first and second PRN component codes A, B alone as shown in FIGS. 6A and 6B.

Further, because the PRN composite code C has a higher effective chip rate and greater effective bandwidth relative to the first and second PRN component codes A and B, the PRN composite code C also can increase the ranging accuracy provided by correlation performed by the correlation module 172 relative to any one of the first and second PRN component codes A and B alone. In FIGS. 5A-5B, the ratio between the correlation peak P1 and the correlation sidelobes for the PRN composite code C is greater than the ratio between the correlation peak P2 for the first and second PRN component codes A, B and their respective correlation sidelobes. In addition, in FIGS. 5C and 5D, the width of correlation mainlobe M1 of the PRN composite code C is narrower and more pronounced than the width of correlation mainlobe M2 of each of the first and second PRN component codes A, B alone. The narrower and more pronounced correlation mainlobe width M1 is, in effect, a representation of both better ranging accuracy and detection performance of the correlation peak of the PRN composite code C. This is consistent with the mainlobe M1 of the PRN composite code C, in its frequency spectrum, being wider than the mainlobe M2 of any one of the first and second PRN component codes A, B, individually.

Referring now to FIGS. 1(1A-1B) and 7A-7C, in one aspect, it is noted that the PRN composite code C, with the higher chip effective rates, may be employed to better estimate time-of-arrival error with the ranging module 175. Referring now to FIG. 7A, the ranging module 175 is configured to sample the correlation mainlobe M3 of the local replica composite code D (e.g. without noise). In one aspect, the ranging module 175 is further configured to generate a quadratic polynomial fit (for example, with a least squares fit) or other suitable fit (for example, cubic polynomial fit) to fit the samples of the correlation mainlobe M3 of the local replica composite code D. In one aspect, the polynomial fit and interpolation is generated by the ranging module 175 to better estimate the time instant corresponding to the correlation peak P3 of the local replica composite code D. Referring now to FIG. 7B, in one aspect, the ranging module 175 employs the polynomial fit and polynomial interpolation generated with respect to local replica composite code D with the sampling of the correlation mainlobe M1 of the PRN composite code C to improve a determination of the correlation peak P1 of the PRN composite code C. Since the estimated time of arrival error is a random parameter as the noise in the transmission is additive Gaussian noise and is random, an asymptotic error can be achieved via a Monte Carlo process by running the estimate time of arrival errors on a fixed carrier power over noise densities over a predetermined high number of iterative loops (for example 1000 runs). In FIG. 7C, the time-of-arrival error accuracy for the first or second PRN component code A, B alone, a two-code composite code (e.g. PRN composite code C) and a three-code composite code is shown. As can be seen in FIG. 7C, as the number of component codes used to form the composite code increases, the time-of-arrival error becomes lower compared to the time of arrival error for any one of the first or second PRN component codes A, B alone.

Examples of the disclosure may be described in the context of a spacecraft 802 as shown in FIG. 8. As shown in FIG. 8, the spacecraft 802 may include an airframe 818 with a plurality of high-level systems and an interior 822. Examples of high-level systems, which are distributed throughout the spacecraft, include one or more of a propulsion system 824, an electrical power system 826, a hydraulic system 828, and an environmental system 830 and the satellite communications relay system 831. The communications relay system 831 may include as the PRN transmitter 110 in direct line of sight contact with the PRN receiver 150 as described herein. In other aspects, the PRN receiver 150 is in direct line of sight with a terrestrial-based PRN transmitter 110A (for example a pseudolite or a CMDA or TDMA-based communications system). In yet other aspects, the PRN transmitter 110 may be an aerial PRN transmitter in the form of, for example, a balloon-based PRN transmitter 110B or an aircraft-based PRN transmitter 110C that are in direct line of sight with the PRN receiver 150. Any number of other systems may be included. Although an aerospace example is shown, the principles of the invention may be applied to other industries, such as wireless communications or positioning and navigation systems.

In accordance with one or more aspects of the present disclosure, the following is provided:

A. A method for ranging of a PRN receiver including generating, at a PRN transmitting device that includes a processor and wireless transmitter and is in a line-of-sight position with the PRN receiver, at least two component codes, time shifting, with the processor of the PRN transmitting device, the at least two component codes relative to each other to form time shifted component codes, wirelessly transmitting, with the PRN transmitting device, the time shifted component codes to the PRN receiver with a predetermined modulation, and receiving the time shifted component codes with the PRN receiver that includes a PRN receiver processor, and determining a range estimate of the PRN receiver based on a combination of the time shifted component codes with the PRN receiver processor.

A1. The method of paragraph A, the PRN transmitting device is a component of a CDMA based positioning system (for example, GPS, GNSS, pseudolites) or a CDMA based communication system or a TDMA based communication system.

A2. The method of paragraph A1, each of the at least two component codes correspond to a ranging signal from a respective ranging source.

A3. The method of paragraph A, the at least two component codes are transmitted on a common carrier with a predetermined carrier power over noise density.

A4. The method of paragraph A, the at least two component codes are transmitted on separate different carriers with a predetermined carrier power over noise density.

A5. The method of paragraph A, further comprising filtering the time shifted component codes with a band-width limited filter of the PRN transmitter and/or receiver.

A6. The method of paragraph A, at least one of the at least two component codes is circularly time shifted relative to other component codes of the at least two component codes.

A7. The method of paragraph A, at least one of the at least two component codes is time shifted relative to other component codes of the at least two component codes on a point to point basis.

A8. The method of paragraph A, the time shifted component codes are transmitted periodically.

A9. The method of paragraph A, the time shifted component codes are transmitted substantially simultaneously.

A10. The method of paragraph A, each of the at least two component codes includes a plurality of chips.

A11. The method of paragraph A, further comprising combining, with the PRN receiver processor, the time shifted component codes into a composite code having a higher effective chip rate than any one of the at least two component codes.

A12. The method of paragraph A11, further comprising determining a correlation between the composite code and a local replica to determine a ranging accuracy of the received time shifted component codes.

A13. The method of paragraph A11, further comprising combining the at least two component codes in a logical exclusive OR (XOR) operation to form the composite code.

A14. The method of paragraph A11, further comprising determining a time of arrival of the time shifted component codes, with the PRN receiver processor, based on the composite code where the time of arrival based on the composite code has a greater accuracy than a time of arrival determined based on any one of the at least two component codes individually.

A15. The method of paragraph A14, further comprising determining a range estimate between the PRN receiver and a PRN transmitting device, based on the accuracy of time of arrival determined from the composite code.

A16. The method of paragraph A11, a ratio between a correlation peak and correlation side lobes of the composite code is substantially equal to or substantially greater than the ratio between a correlation peak and correlation side lobes of any one of the at least two component codes.

A17. The method of paragraph A, the predetermined modulation corresponds with a targeted band-width of the PRN receiver.

A18. The method of paragraph A, further comprising displaying a visual representation of the solution of the PRN receiver on a display of the PRN receiver.

A19. The method of paragraph A, the time shifted component codes are received by the PRN receiver substantially simultaneously.

B. A method for ranging of a PRN receiver includes wirelessly receiving time shifted component codes with the PRN receiver having a PRN receiver processor, where the time shifted component codes include at least two component codes that are received substantially simultaneously by the PRN receiver, combining, with the PRN receiver processor, the at least two component codes of the time shifted component codes into a composite code by performing an exclusive OR operation on the at least two component codes, and determining a range estimate of the PRN receiver and a PRN transmitting device based on the composite code with the PRN receiver processor.

B1. The method of paragraph B, further comprising wirelessly transmitting the time shifted component codes to the PRN receiver with the PRN transmitting device.

B2. The method of paragraph B1, the PRN transmitting device is a component of a CDMA based positioning system (for example, GPS, GNSS, pseudolites) or a CDMA based communication system or a TDMA based communication system capable of using PRN ranging signals.

B3. The method of paragraph B1, each of the at least two component codes corresponds to a ranging signal from a respective ranging source.

B4. The method of paragraph B, the at least two component codes are received by the PRN receiver on a common carrier with a predetermined carrier power over noise density.

B5. The method of paragraph B, the at least two component codes are received by the PRN receiver on separate different carriers with a predetermined carrier power over noise density.

B6. The method of paragraph B, further comprising filtering the time shifted component codes with a band-width limited filter of the PRN receiver.

B7. The method of paragraph B, at least one of the at least two component codes is circularly time shifted relative to other component codes of the at least two component codes.

B8. The method of paragraph B, at least one of the at least two component codes is time shifted relative to other component codes of the at least two component codes on a point-to-point basis.

B9. The method of paragraph B, the time shifted component codes are received periodically by the PRN receiver.

B10. The method of paragraph B, the time shifted component codes are received substantially simultaneously by the PRN receiver.

B11. The method of paragraph B, each of the at least two component codes includes a plurality of chips.

B12. The method of paragraph B, the composite code has a higher effective chip rate than any one of the at least two component codes.

B13. The method of paragraph B, further comprising determining a correlation between the composite code and a local replica to determine a ranging accuracy of the received time shifted component codes.

B14. The method of paragraph B, further comprising determining a ranging accuracy of arrival of the time shifted component codes based on the composite code where the time of arrival based on the composite code has a greater accuracy than a time of arrival determined based on any one of the at least two component codes individually.

B15. The method of paragraph B12, further comprising— determining a pseudorange accuracy between the PRN receiver and the PRN transmitting device based on the accuracy of time of arrival determined from the composite code.

B16. The method of paragraph B, a ratio between a correlation peak and correlation side lobes of the composite code is substantially equal to or substantially greater than the ratio between a correlation peak and correlation side lobes of any one of the at least two component codes.

B17. The method of paragraph B, further comprising displaying a visual representation of the location of the PRN receiver on a display of the PRN receiver.

C. A PRN receiver ranging and tracking system includes a PRN receiver having a PRN processor configured to wirelessly receive time shifted component codes, where the time shifted component codes include at least two component codes that are received substantially simultaneously by the PRN receiver, combine the at least two component codes of the time shifted component codes into a composite code with an exclusive OR operation on the at least two component codes, and determine a range estimate of the PRN receiver to a PRN transmitting device based on the composite code.

C1. The PRN receiver ranging and tracking system of paragraph C, further comprising a PRN transmitting device, in line-of-sight position with the PRN receiver, having a processor and wireless transmitter, the PRN receiver is configured to wirelessly receive time shifted component codes from the PRN transmitting device.

C2. The PRN receiver ranging and tracking system of paragraph C, the PRN transmitting device is a component of a CDMA based positioning system (for example, GPS, GNSS, pseudolites) or a CDMA based communication system or a TDMA based communication system.

C3. The PRN receiver ranging and tracking system of paragraph C2, each of the at least two component codes correspond to a ranging signal from a respective ranging source.

C4. The PRN receiver ranging and tracking system of paragraph C, the PRN receiver further comprising a bandwidth limited filter configured to titter the time shifted component codes.

C5. The PRN receiver ranging and tracking system of paragraph C, at least one of the at least two component codes is circularly time shifted relative to other component codes of the at least two component codes.

C6. The PRN receiver ranging and tracking system of paragraph C, at least one of the at least two component codes is time shifted relative to other component codes of the at least two component codes on a point-to-point basis.

C7. The PRN receiver ranging and tracking system of paragraph C, the time shifted component codes are received periodically by the PRN receiver.

C8. The PRN receiver ranging and tracking system of paragraph C, the time shifted component codes are received substantially simultaneously by the PRN receiver.

C9. The PRN receiver ranging and tracking system of paragraph C, each of the at least two component codes includes a plurality of chips.

C10. The PRN receiver ranging and tracking system of paragraph C, the composite code has a higher effective chip rate than any one of the at least two component codes.

C11. The PRN receiver ranging and tracking system of paragraph C, the PRN receiver processor is configured to determine a correlation between the composite code and a local replica to determine a ranging accuracy of the received time shifted component codes.

C12. The PRN receiver ranging and tracking system of paragraph C, the PRN receiver processor is configured to determine a accuracy of time of arrival of the time shifted component codes based on the composite code where the time of arrival based on the composite code has a greater accuracy than a time of arrival determined based on any one of the at least two component codes individually.

C13. The PRN receiver ranging and tracking system of paragraph C12, the PRN receiver processor is configured to determine pseudorange accuracy of the PRN receiver and the PRN transmitting device based on the time of arrival determined from the composite code.

C14. The PRN receiver ranging and tracking system of paragraph C, a ratio between a correlation peak and correlation side lobes of the composite code, generated by the PRN receiver processor, is substantially equal to or substantially greater than the ratio between a correlation peak and correlation side lobes of any one of the at least two component codes.

C16. The PRN receiver ranging and tracking system of paragraph C, the PRN receiver further comprising a display configured to display a visual representation of the location of the PRN receiver.

Different examples and aspects of the apparatus and methods are disclosed herein that include a variety of components, features, and functionality. It should be understood that the various examples and aspects of the apparatus and methods disclosed herein may include any of the components, features, and functionality of any of the other examples and aspects of the apparatus and methods disclosed herein in any combination, and all of such possibilities are intended to be within the spirit and scope of the present disclosure.

Many modifications and other examples of the disclosure set forth herein will come to mind to one skilled in the art to which the disclosure pertains having the benefit of the teachings presented in the foregoing descriptions and the associated drawings.

Therefore, it is to be understood that the disclosure is not to be limited to the specific embodiments disclosed and that modifications and other embodiments are intended to be included within the scope of the appended claims. Moreover, although the foregoing descriptions and the associated drawings describe example embodiments in the context of certain illustrative combinations of elements and/or functions, it should be appreciated that different combinations of elements and/or functions may be provided by alternative implementations without departing from the scope of the appended claims.

What is claimed is:

1. A method for ranging of a Pseudorandom Noise (PRN) receiver, the method comprising:
generating, at a PRN transmitting device that includes a processor and wireless transmitter and is in a line-of-sight position with the PRN receiver, at least two component codes;

time shifting, with the processor of the PRN transmitting device, the at least two component codes relative to each other to form time shifted component codes;

wirelessly transmitting, with the PRN transmitting device, the time shifted component codes to the PRN receiver with a predetermined modulation; and receiving the time shifted component codes with the PRN receiver that includes a PRN receiver processor, and determining a range estimate of the PRN receiver based on a combination of the time shifted component codes with the PRN receiver processor.

2. The method of claim 1, wherein the PRN transmitting device is a component of a CDMA based positioning system or a CDMA based communication system or a TDMA based communication system.

3. The method of claim 2, wherein each of the at least two component codes corresponds to a ranging signal from a respective ranging source.

4. The method of claim 1, wherein the at least two component codes are transmitted on a common carrier with a predetermined carrier power over noise density.

5. The method of claim 1, wherein the at least two component codes are transmitted on separate carriers with a predetermined carrier power over noise density.

6. The method of claim 1, further comprising combining, with the PRN receiver processor, the time shifted component codes into a composite code having a higher effective chip rate than any one of the at least two component codes.

7. The method of claim 6, further comprising combining the at least two component codes in an exclusive OR (XOR) operation to form the composite code.

8. The method of claim 6, further comprising determining a ranging accuracy of arrival of the time shifted component codes, with the PRN receiver processor, based on the composite code where the time of arrival based on the composite code has a greater accuracy than a time of arrival determined based on any one of the at least two component codes individually.

9. The method of claim 8, further comprising determining a pseudorange between the PRN receiver and the PRN transmitting device, based on the ranging accuracy of arrival determined from the composite code.

10. A method for ranging of a Pseudorandom Noise (PRN) receiver, the method comprising:

wirelessly receiving time shifted component codes with the PRN receiver having a PRN receiver processor, where the time shifted component codes include at least two component codes that are received substantially simultaneously by the PRN receiver;

combining, with the PRN receiver processor, the at least two component codes of the time shifted component codes into a composite code by performing an exclusive OR (XOR) operation on the at least two component codes; and determining a range estimate of the PRN receiver and a PRN transmitting device based on the composite code with the PRN receiver processor.

11. The method of claim 10, further comprising wirelessly transmitting the time shifted component codes to the PRN receiver with the PRN transmitting device.

12. The method of claim 11, wherein the PRN transmitting device is a component of a CDMA based positioning system or a CDMA based communication system or a TDMA based communication system capable of using PRN ranging signals.

13. The method of claim 11, wherein each of the at least two component codes correspond to a ranging signal from a respective ranging source.

14. The method of claim 10, further comprising determining a ranging accuracy of arrival of the time shifted component codes based on the composite code where the time of arrival based on the composite code has a greater accuracy than a time of arrival determined based on any one of the at least two component codes individually.

15. The method of claim 10, further comprising determining a pseudorange accuracy between the PRN receiver and the PRN transmitting device based on the time of arrival determined from the composite code.

16. A Pseudorandom Noise (PRN) receiver ranging and tracking system comprising:

a PRN receiver having a PRN receiver processor configured to:

wirelessly receive time shifted component codes, where the time shifted component codes include at least two component codes that are received substantially simultaneously by the PRN receiver;

combine the at least two component codes of the time shifted component codes into a composite code with an exclusive OR (XOR) operation on the at least two component codes; and determine a range estimate of the PRN receiver to a PRN transmitting device based on the composite code.

17. The system of claim 16, wherein the PRN transmitting device is a component of a CDMA based positioning system or a CDMA based communication system or a TDMA based communication system.

18. The system of claim 16, wherein the composite code has a higher effective chip rate than any one of the at least two component codes.

19. The system of claim 16, wherein the PRN receiver processor is configured to determine a accuracy of time of arrival of the time shifted component codes based on the composite code where the time of arrival based on the composite code has a greater accuracy than a time of arrival determined based on any one of the at least two component codes individually.

20. The system of claim 19, wherein the PRN receiver processor is configured to determine pseudorange accuracy of the PRN receiver and the PRN transmitting device based on the time of arrival determined from the composite code.

* * * * *